(No Model.)  J. D. GARFIELD.  5 Sheets—Sheet 5.
PHOTOGRAPHIC CAMERA.
No. 501,931.   Patented July 25, 1893.
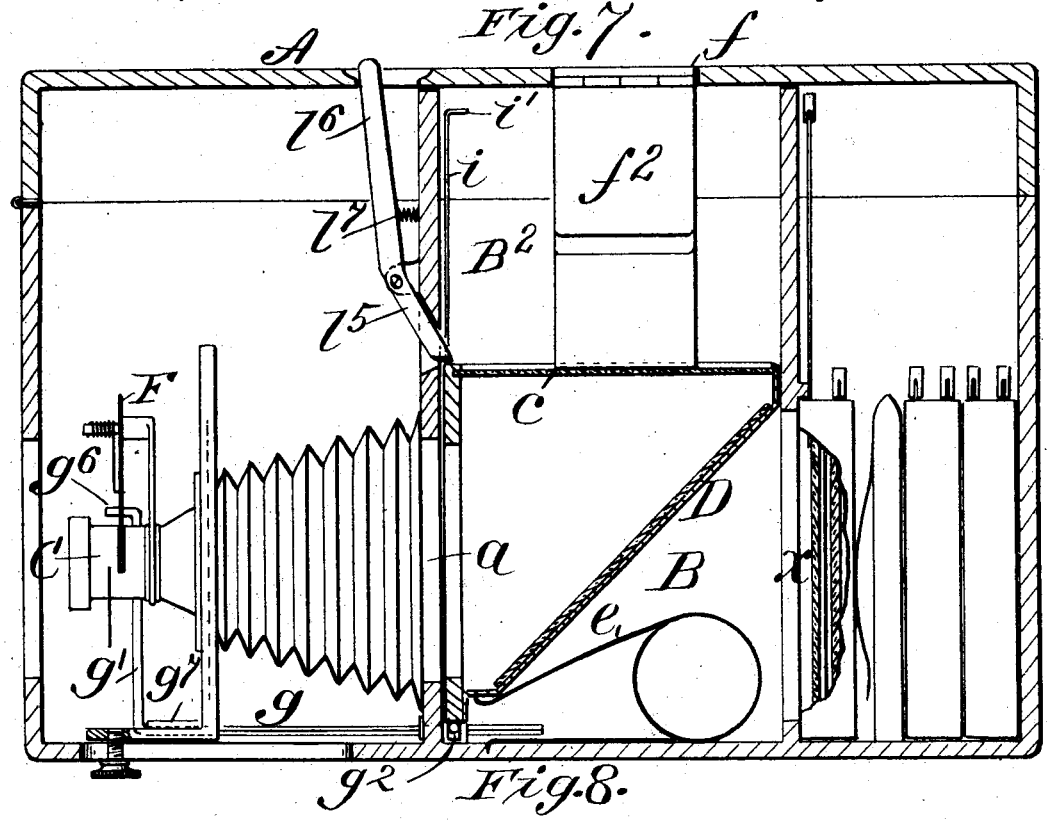
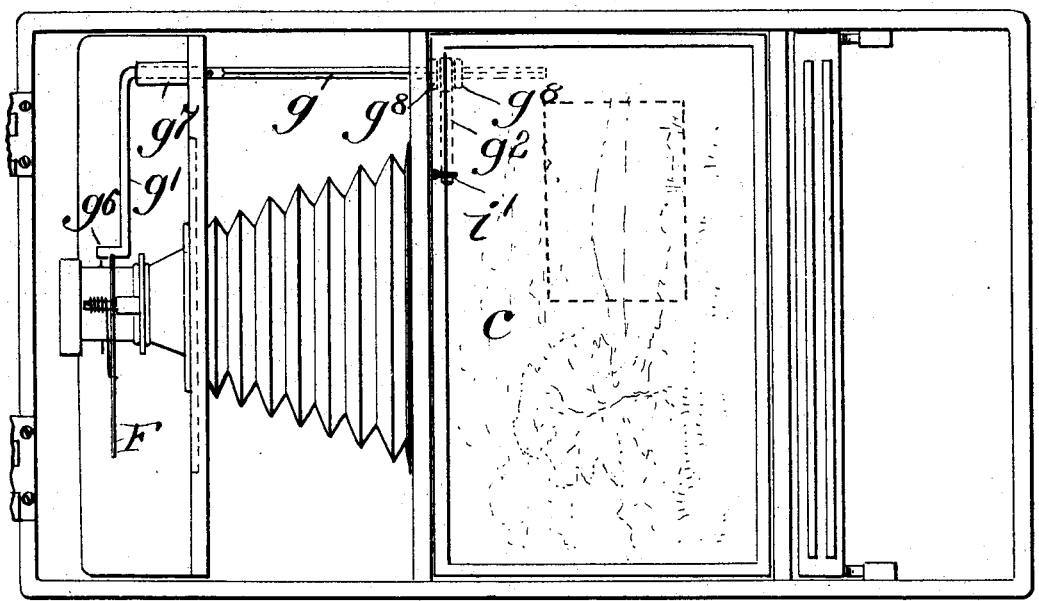

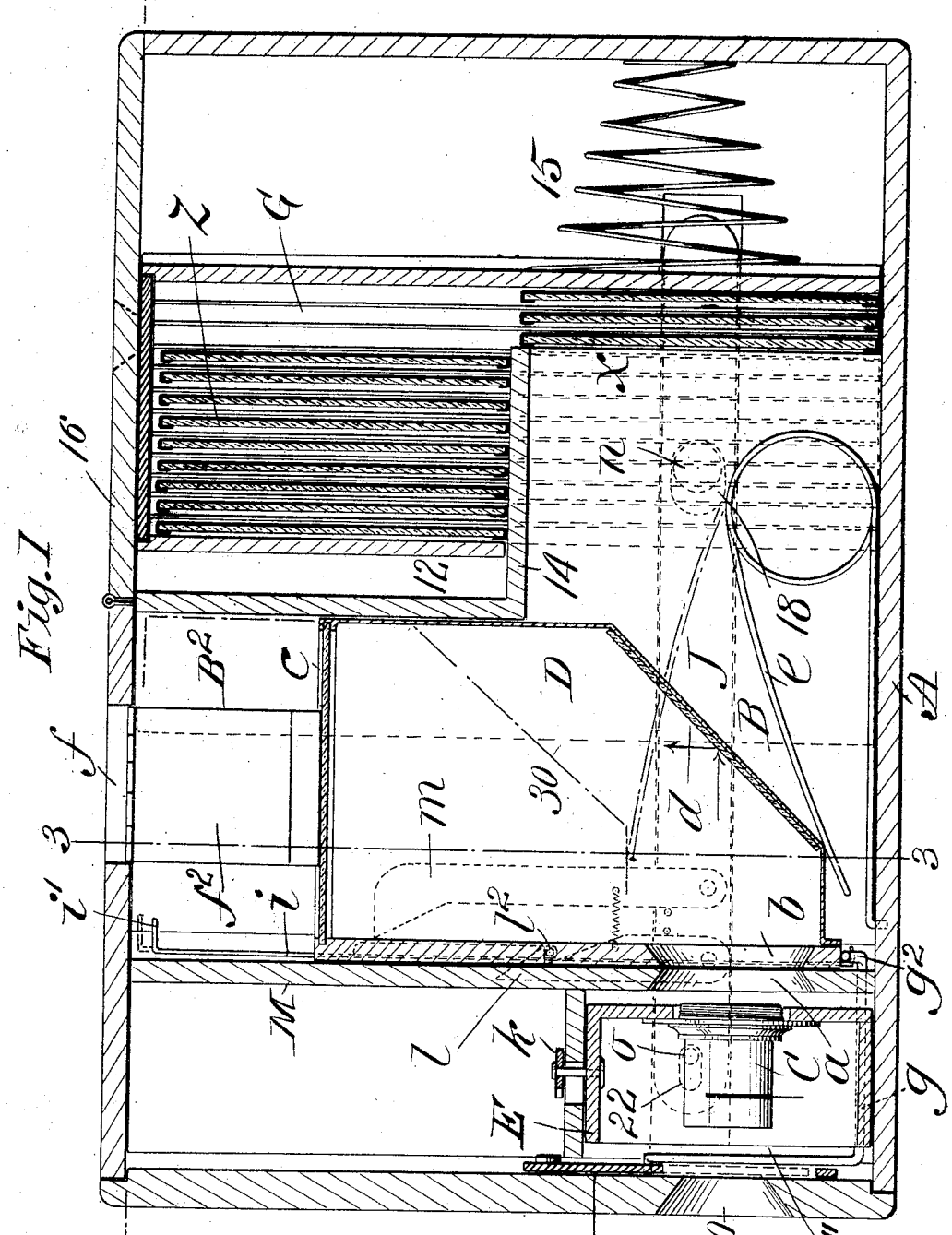

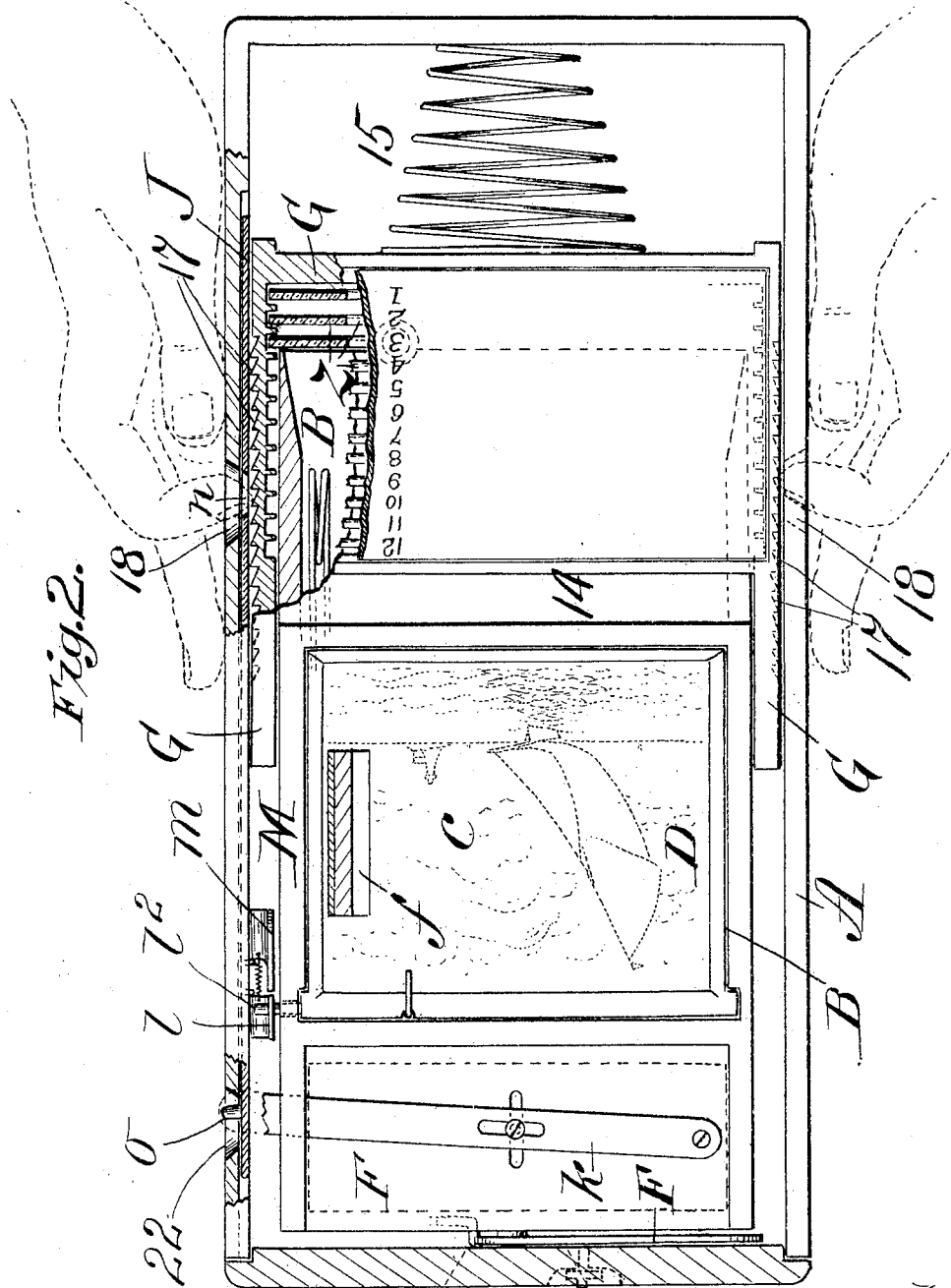

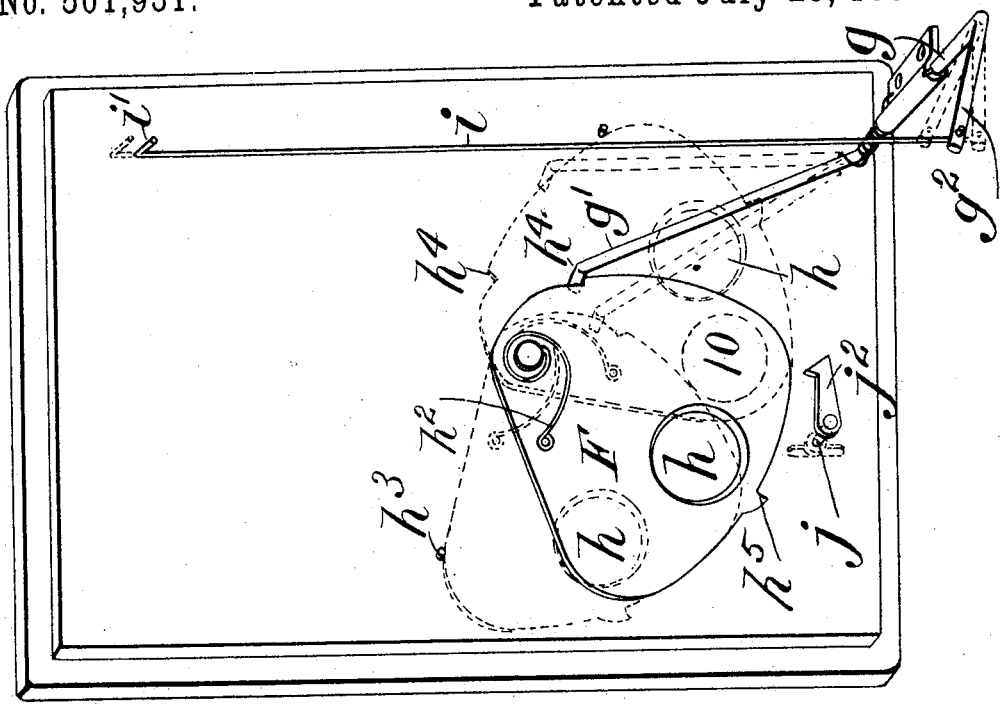
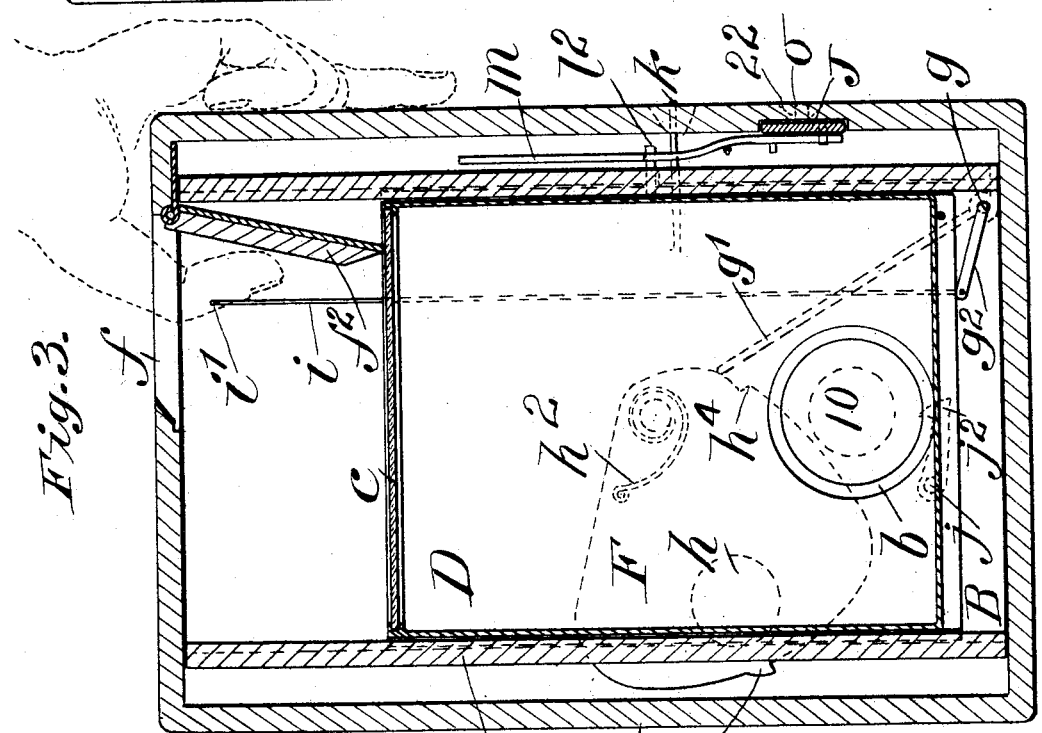

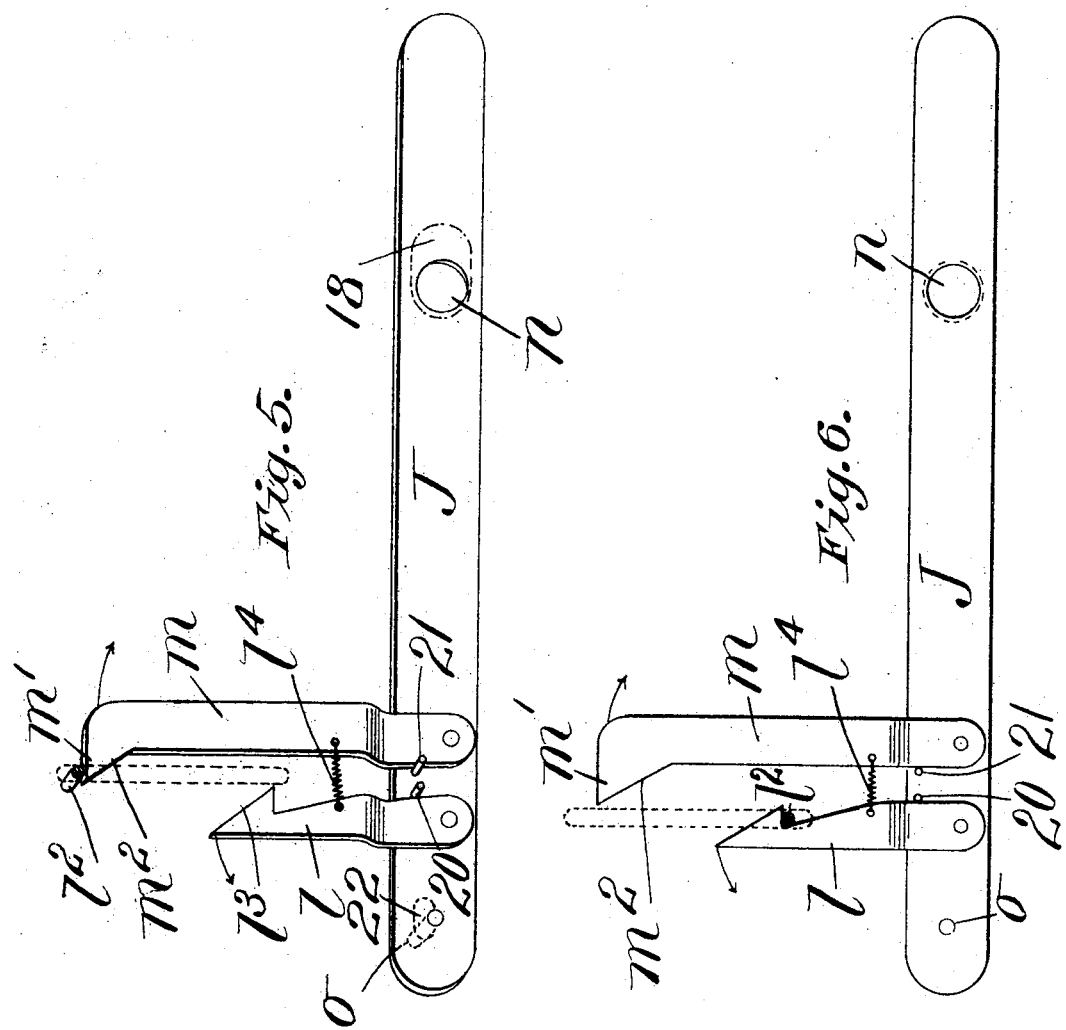

UNITED STATES PATENT OFFICE.

JULIUS D. GARFIELD, OF SPRINGFIELD, ASSIGNOR OF ONE-HALF TO HENRY EMERY, OF HOLYOKE, MASSACHUSETTS.

PHOTOGRAPHIC CAMERA.

SPECIFICATION forming part of Letters Patent No. 501,931, dated July 25, 1893.

Application filed April 20, 1892. Serial No. 429,959. (No model.)

*To all whom it may concern:*

Be it known that I, JULIUS D. GARFIELD, of Springfield, county of Hampden, and State of Massachusetts, have invented certain new and useful Improvements in Photographic Cameras, of which the following is a full, clear, and exact description.

This invention relates to improvements in photograph cameras.

The objects of the invention are various, notable among which are:—To provide an improved finder or means for discerning the picture to be taken before the exposure is made; to provide novel and improved means which co-act with the finder and shutter, whereby, when the finder is moved into its operative position, the shutter will be set; to provide means which also co-act with the shutter and finder whereby the latter may be permitted to resume its normal position and the shutter be sprung to make the exposure; to provide improved magazine appliances and to provide devices which co-operate therewith and with the shutter whereby after one plate or film has been exposed, another exposure may not be made until after a plate or film has been brought into the position for exposure.

Other objects of the invention are to generally cheapen and simplify the camera, and to increase the facility and efficiency of its operation.

To these ends my invention consists in the novel construction, combination and arrangement of parts hereinafter described and claimed, reference being made to the accompanying drawings, in which—

Figure 1 is a central longitudinal vertical section of a camera which comprises the lens, the shutter, the finder, and the magazine appliances, and conjunction devices therefor. Fig. 2, is a plan view of same, taken on the plane 2—2, Fig. 1, some parts being broken away and other parts shown in section. Fig. 3 is a transverse vertical section on line 3—3, Fig. 1. Fig. 4 is a perspective view especially illustrative of the shutter. Figs. 5 and 6 are side views of mechanism to be hereinafter more particularly referred to. Figs. 7 and 8 are respectively a central vertical section and a plan view of a camera embodying several features of the invention, the top of the camera box being understood as removed in Fig. 8. Fig. 9 is a perspective view of parts in detail to be hereinafter referred to.

The camera embodies a suitable box or casing A, having provided therefor, at the front end or side thereof, a lens tube C, which is suitably supported and of any of the suitable constructions common or approved.

In rear of the lens is a compartment B, the front wall of which is provided with an opening $a$, and at the rear of said compartment B, the plates of film are disposed to receive exposure through the lens, as hereinafter described. In the said compartment B, behind the front wall thereof and capable of free movement into and out of a position between the lens C, and the plate to be exposed, is a casing D, having an opening $b$ in its front wall and provided at its lower rear portion with an inclined mirror $d$, and in the top of said casing is located a pane of ground glass $c$, onto which the image or picture cast upon the mirror through the lens will be reflected.

The casing D and contained parts constitute the finder of my invention.

The reference letter $e$ represents a spring one end of which is secured to the box or casing A, and the other or free end of which engages the lower end of the finder casing D, and operates to throw the said casing out of its position between the lens C and the plate to be exposed.

The box or casing A is provided in front of the portion $B^2$ of the space B, with an opening $f$, having an inwardly opening hinged door or trap $f^2$, which is adapted to be normally closed and which when opened impinges against the finder casing D and forces it, into a position between the lens and the plate to be exposed (which will be hereinafter termed its operative position) in which position the opening $b$ in the front wall of the finder casing registers with the opening $a$ and also with the lens, whereby the picture to be taken is reflected upon the ground glass $c$. The distance between the mirror $d$ and the ground glass $c$ is the same or substantially the same as the distance between the mirror and the plate to be exposed.

A suitable latch or confining device, is provided for temporarily holding the finder in its operative position.

The space $B^2$ in which the finder plays, and the finder casing itself, and also the exposing space, proper, are all so constructed and closely fitted that, with a plate in its position for exposure, and the finder in its operative position, and the lens uncovered, there will be no liability of any light reaching the plate. But the picture having been properly sighted and focused in the usual manner, the finder is caused to be thrown out of its operative position when the picture may be taken.

In Fig. 1, the finder is by full lines shown as in its operative position and in said Fig. 1 the position of the finder when out of its operative position is indicated by broken lines at 30.

The lens is provided with a shutter of any suitable or approved form, the one herein particularly shown and its conjunctive devices embodying certain features of novelty which will now be set forth.

The shutter, F, is shown as a thin diaphragm of suitable form, and is pivotally mounted adjacent the lens to swing across the lens opening, being provided with an aperture $h$, so that when the aperture is opposite or passing the lens opening the usual exposure may be made the solid portions of said shutter preventing exposure when they cover the lens opening and this shutter is in many respects similar to well known forms of shutters.

The shutter may be either supported on the front board of the case which has the opening 10 as seen in Fig. 1, or it may be supported by the lens casing as indicated in Figs. 7 and 8, or suitably otherwise. The shutter has a spring as $h^2$, suitably applied thereto for springing it, after it has been set, for making the exposure, and $h^3$ represents a stop for limiting the setting movement. The shutter is when set understood as being in such a position that the object may be transmitted through the lens either on to the finder, or upon the plate, after the withdrawal of the finder. The shutter is indicated as in its set position in Fig. 3, and by the dotted lines at the left, Fig. 4. The shutter is provided with a shoulder, such for instance as indicated at $h^4$, and, co-acting therewith, is one arm, $g'$, of a rocking or oscillating shaft, $g$, which arm is in suitable proximity to the shutter, and which rock-shaft is mounted in suitable bearings and has a portion thereof extended into the space B where it is provided with another arm or member $g^2$. The arm, $g'$, is considerably longer than the arm, $g^2$, so that a slight rocking movement imparted to the shaft through the said arm $g^2$ will effect a much greater travel of the arm $g'$ as required to the set shutter. When the finder is being forced to its operative position it will, when it has been so far depressed as to prevent any light which might come through the lens passing to the plate at $x$, engage the arm $g^2$, whereby the shaft $g$ is rocked or oscillated and through the arm $g'$ thereof the shutter is set, to admit the reflection upon the ground glass $c$ of the object to be taken. Having determined the scope and focusing of the object by means of the finder, said finder is removed from its operative position by the spring $e$, when the object will be photographed upon the plate or film. The finder casing D in its movement out of operative position effects the springing of the shutter. This result is secured by the abutment of said casing at the latter portion of its movement against the offset lettered $i'$ of the rod $i$ which is engaged with the short arm $g^2$ of the shaft $g$.

The foregoing reference to the shutter contemplates no particular or specific kind of shutter, and hence the shutter-retaining and actuating devices which co-act with the finder may be operatively applied with interchangeable forms of shutters as manifest.

For making time pictures I have provided a very simple device as follows:—The shutter being understood as provided with a lug $h^5$, a spindle $j$ is mounted adjacent to the shutter and has thereon a hooked arm $j^2$ which after the shutter is set and the spindle is turned to present the hooked arm in the way of the lug $h^5$, will hold the shutter in an open position thereof even after the detent arm $g'$, has, by reason of the operations hereinbefore set forth, been withdrawn from engagement with the shutter. Thus after the complete withdrawal of the finder from its operative position, the exposure may be indefinitely continued and will be terminated only by turning the spindle $j$.

In Fig. 1 the lens tube is shown as supported by a box-like casing E, and has a sliding movement toward and from the position of the plate to be exposed by the lever $k$, it at such time also having a bodily movement toward or from the shutter.

In Figs. 7 and 8 the shutter is supported by and is movable with, the lens which has the well known form of bellows connection, and in order that the arm $g'$ of the rock-shaft $g$ may be in engagement with the shutter under any position thereof as it moves with the lens the rock-shaft is rotatably mounted as at $g^7$ on a movable board which supports the lens and shutter, the said shaft being constrained against axial movement relative thereto and also plays through bearings in the separated ear-pieces $g^8$, $g^8$, which are adjacent the chamber B. The rod $g$ is squared, and the arm $g^2$ has a squared aperture in its hub which latter engages the shaft, and is, itself, prevented from endwise movement as the shaft moves, by its confinement between the said ear-pieces.

Different forms of devices for holding the finder in its operative position may be employed. The one $l$ shown in Figs. 1, 2, 5 and 6 consists of a pivotally mounted hooked-formed arm which is adapted to engage a stud $l^2$ projecting from the side of the finder case. When the finder is moved downwardly the stud has a cam-like action against the inclined extremity $l^3$ of the hook-formed arm, forcing the latter against the tension of the spring $l^4$ until the stud has come to its lowest position to permit the hook to engage with it, as insured by the re-action of the spring.

In Fig. 7 the finder is retained by the catch device which consists of an intermediately pivoted lever having an arm $l^5$ suitably projected to act as a detent for the finder, its release being effected by swinging the arm $l^6$ against the action of the spring $l^7$.

The magazine appliances will be now described and in conjunction therewith, mechanisms which have dependent relations with the finder and the shutter devices.

The casing M which directly incloses the exposing space and chamber for the finder,—and which casing is inclosed within the main box of the camera,—has its rear portion of the step-form indicated at 12 in Fig. 1, and the rear end of said casing is open as will be understood from an inspection of the drawings.

The magazine consists of a frame or rack G, having its opposite sides provided with vertical ways or grooves for the reception and engagement therein of the vertical edge portions of the plates, a series of which is indicated especially in Figs. 1 and 2 at $z$. The magazine is moved forward and backward, and such plates therein as may be in advance of the exposing position $x$, will be supported by the ledge or board 14. As the magazine is rearwardly moved, plate after plate will fall off from the ledge into the exposing position. The borders of the plates lying against the boundaries of the open orifice at the rear of the exposing space will be there held under suitable forward pressure by the spring, 15.

The magazine is adapted to be opened at its top and to receive, or to be discharged of, plates through the hinged door 16 of the main camera box.

The magazine is provided with a series of notches or serrations 17, Fig. 2 at its opposite outer sides, there being in the sides of the camera box, openings, indicated at 18, through which the magazine may be rearwardly moved, as a new plate is to be dropped, by the fingers,—the manner of which operation is very clearly indicated by the drawings, Fig. 2. There is, extending horizontally from front to rear and on the inside of one side wall of the main box, a slide bar J on which the aforementioned catch-bar $l$ for the finder is pivotally mounted. There is also pivotally mounted on said slide-bar a second arm, $m$, longer than the arm $l$ and having at its extremity the nose $m'$ the top of which is substantially horizontal, the side thereof being inclined as at $m^2$. The aforementioned spring $l^4$ has its ends connected to each of the pivoted bars, the latter being limited at the normal positions indicated by the stop pins 20, 21. The slide-bar has an aperture $n$ through it which is smaller than, and in registry with a portion of the aforesaid opening 18. The slide-bar J furthermore has at another portion in its length the outwardly extended stud $o$ which is projected through the aperture, 22, in the side of the camera-box. The slide-bar is adapted to remain by frictional engagement in the slideway therefor, in any position in which it may be set. The bar $m$ maintains the finder in its raised position by reason of the engagement of the stud $l^2$ with the top of said bar.

The operation of the magazine and conjunctive devices will be described and the utility and advantage thereof explained. The magazine rack, being therefore rearwardly moved to permit a plate to drop into the exposing position the finder is then forced into its operative position, thereby setting the shutter; and the finder stud $l^2$ snaps into engagement with the hook-bar $l$. The focusing having been completed, the finder is released for its withdrawal from operative position, by moving the slide-bar J, through means of its stud $o$, forwardly; now said bar J by reason of its having the pin 20 engaging bar $l$ moves the latter bodily out of engagement with the catch-stud, $l^2$, of the finder, and the finder is forced by its spring, $e$, to its uppermost position in the vertical wing of the space, B,—the stud by its impingement against the incline $m^2$ of bar $m$, forcing itself beyond the end of the latter which then snaps into engagement with the stud. Now as it is important that there shall never be a second exposure until another plate has been brought into the exposing position, and as it is a matter of likelihood that such accident might frequently occur, the forward disposition of the slide-bar J assumed on its thrust as above described, for releasing the finder and springing the shutter, becomes very advantageous. This is for the reason that the bar, when forward maintains the finder practically locked against movement into its operative position and the shutter against being automatically set, and therefore, to effect the unlocking, the bar must be rearwardly moved, the operation being simultaneously performed (through the side opening, 18, of the camera-box) with the action of rearwardly moving the magazine back and insures the pursuance of the proper operations most readily in their correct succession or rotation.

I claim—

1. In a camera the combination, with a casing having a lens-opening, a lens and an exposing chamber in rear of the lens, of a shutter, a finder movable into and out, of a position between said lens and the plates in the exposing chamber, and a shutter setting device having a portion located in the path of movement of and operated by said finder, substantially as described.

2. In a magazine camera, the combination with a casing having a lens-opening, a lens, and exposing chamber in rear thereof, of an inwardly opening door in said casing, and a finder casing located in the path of the inwardly opening door, and operated thereby substantially as described.

3. In a camera, the combination with a casing having a lens opening, a lens, and chamber in rear of said lens, of a shutter, a finder movable into and out of a position at the rear of the lens, and a rock-shaft having two arms, one of which engages the shutter, and the other of which is located in the path of movement of the finder, whereby the shutter is operated by the finder depressing that arm of the rock-shaft which lies in the path of said finder, substantially as described.

4. In a camera, the combination with a casing having a lens-opening, a lens and a chamber in rear of said lens, of a shutter a finder movable in said chamber, a device engaging said shutter a portion of which is located in the path of and which is operated by said finder driving its movement in one direction, and shutter releasing mechanism located in the path of said finder and connected with said shutter operating device, said shutter releasing mechanism operated by the finder during its movement in the other direction to release the shutter, substantially as described.

5. In a camera the combination with a casing having a lens-opening, a lens, and a chamber in the rear of said lens, of an apertured shutter pivotally supported to swing across the lens, a finder movable in said chamber, and a rock-shaft having the arms $g'$, $g^2$ and the rod $i$, connected to one of said arms and adapted to be engaged and moved by the finder on the withdrawal of said finder from its position in rear of the lens, substantially as described.

6. The combination with a camera-box having a lens-opening, a lens, and a chamber back of the lens, of a movable shutter, a finder movable in said chamber, a shutter-operating shaft a portion of which is located in the path of and operated by the finder, mechanism located in the path of and operated by said finder for releasing said shutter from the shutter operating shaft, a catch device automatically engaging said finder and retaining the same in its lowered and raised position, and a movable support connected with said catch device to release the finder therefrom, substantially as described.

7. In a camera, the combination with a lens and a finder movable transversely of the axial line of the lens, as specified, provided with the stud $l^2$, of the hooked bar $l$, and the bar $m$, a spring for each of said bars, and a movable support on which said bars are mounted for movements, substantially as described.

8. In a camera the combination with the lens and a movable finder provided with the stud $l^2$, of the slide bar J, having the hooked-bar $l$, and the bar $m$ of unequal length, pivotally mounted thereon and said bars having the inclines $l^3$, and $m^2$, the stops 20, 21, and a spring applied to each bar, substantially as described.

9. In a camera the combination with a casing having apertures in its opposite sides and a lens-opening, a lens, a chamber at the rear of said lens, and a movable shutter, of a finder movable in said chamber transversely of the axial line of the lens, a device between and coacting with the finder and shutter which is adapted to be actuated by the finder and which sets and releases the shutter, a slide bar having an aperture $n$ registering with the apertures in the sides of the casing and also having automatic catch devices for engaging the finder to retain it in either its position opposite the lens, or its position transversely removed therefrom, which devices are bodily movable with the slide bar whereby either of said engagements that may be established will be released by the movement of said bar, substantially as described.

10. In a camera the combination with a casing having openings 18 and 22, through its side and a lens aperture a lens, a chamber back of the lens, and a lens-shutter, of a finder movable in said chamber and provided with a catch stud, a device between and coacting with the finder and shutter for setting and springing the shutter on the movements of the finder, a magazine movable within said casing, the slide bar J, having an aperture $n$ registering with the opening 18, and having the stud $o$ at the opening 22, and the catch bars $l$ and $m$ of unequal length and having engaging portions properly located to engage said stud $o$, substantially as described.

JULIUS D. GARFIELD.

Witnesses:
HENRY EMERY,
WM. S. BELLOWS.